S. B. VOSS.
FLYING MACHINE.
APPLICATION FILED JULY 1, 1913.

1,097,489.

Patented May 19, 1914.
6 SHEETS—SHEET 4.

Witnesses
Frank Hough
C. C. Hines

Inventor
Simon B. Voss,
By Victor J. Evans
Attorney

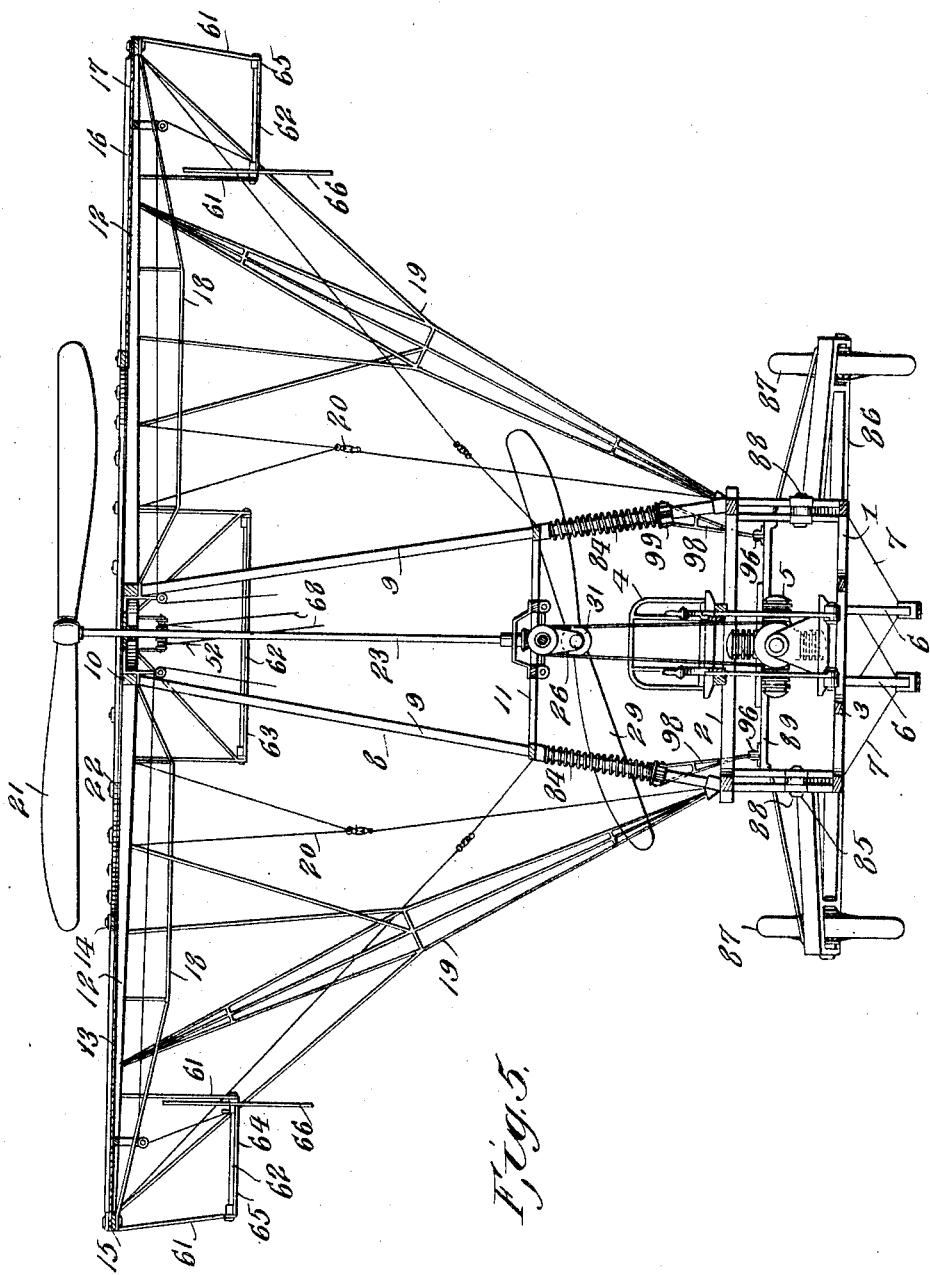

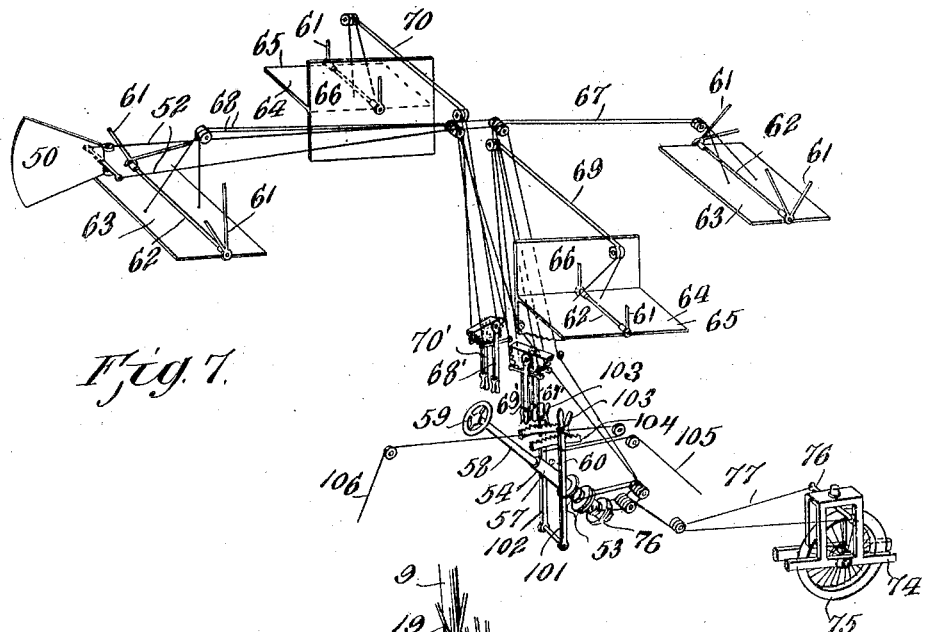

UNITED STATES PATENT OFFICE.

SIMON B. VOSS, OF HARTLY, DELAWARE.

FLYING-MACHINE.

1,097,489.

Specification of Letters Patent. Patented May 19, 1914.

Application filed July 1, 1913. Serial No. 776,823.

*To all whom it may concern:*

Be it known that I, SIMON B. VOSS, a citizen of the United States, residing at Hartly, in the county of Kent and State of Delaware, have invented new and useful Improvements in Flying-Machines, of which the following is a specification.

This invention relates to flying machines of the heavier-than-air type.

The objects of the invention are, first, to provide a machine having inherent stability and which may be conveniently trimmed or balanced as necessary according to varying dispositions of the parts of the load weight carried; second, to provide a novel construction of supporting surface and propelling, lifting and stabilizing means by which the machine may be caused to ascend or descend in a straight path, to hover in the air over any given point, to be steered and balanced with facility, and to descend safely with a parachutic effect in case of stoppage of the motor; third, to provide an improved type of landing gear adjustable to vary the center of gravity of the machine as required and to effectually cushion all shocks and jars in landing; fourth, to provide simple, reliable and efficient means for controlling the movable parts and governing the lifting and propelling mechanism; and, finally, to provide a machine which may be easily handled by even inexperienced fliers.

The invention consists of the features of construction, combination and arrangement of parts hereinafter fully described and claimed, reference being had to the accompanying drawings, in which:—

Figure 1:
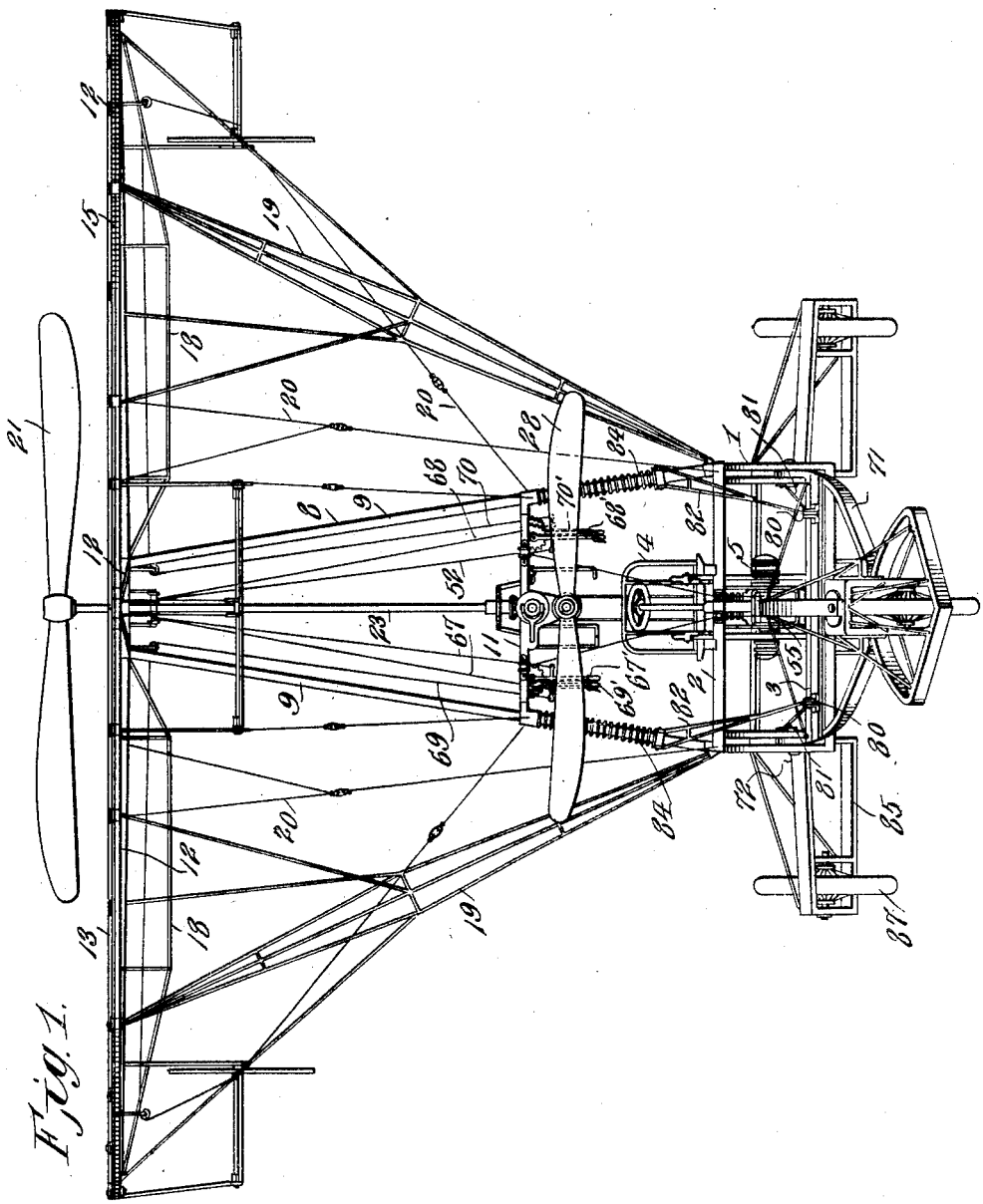
Figure 2:
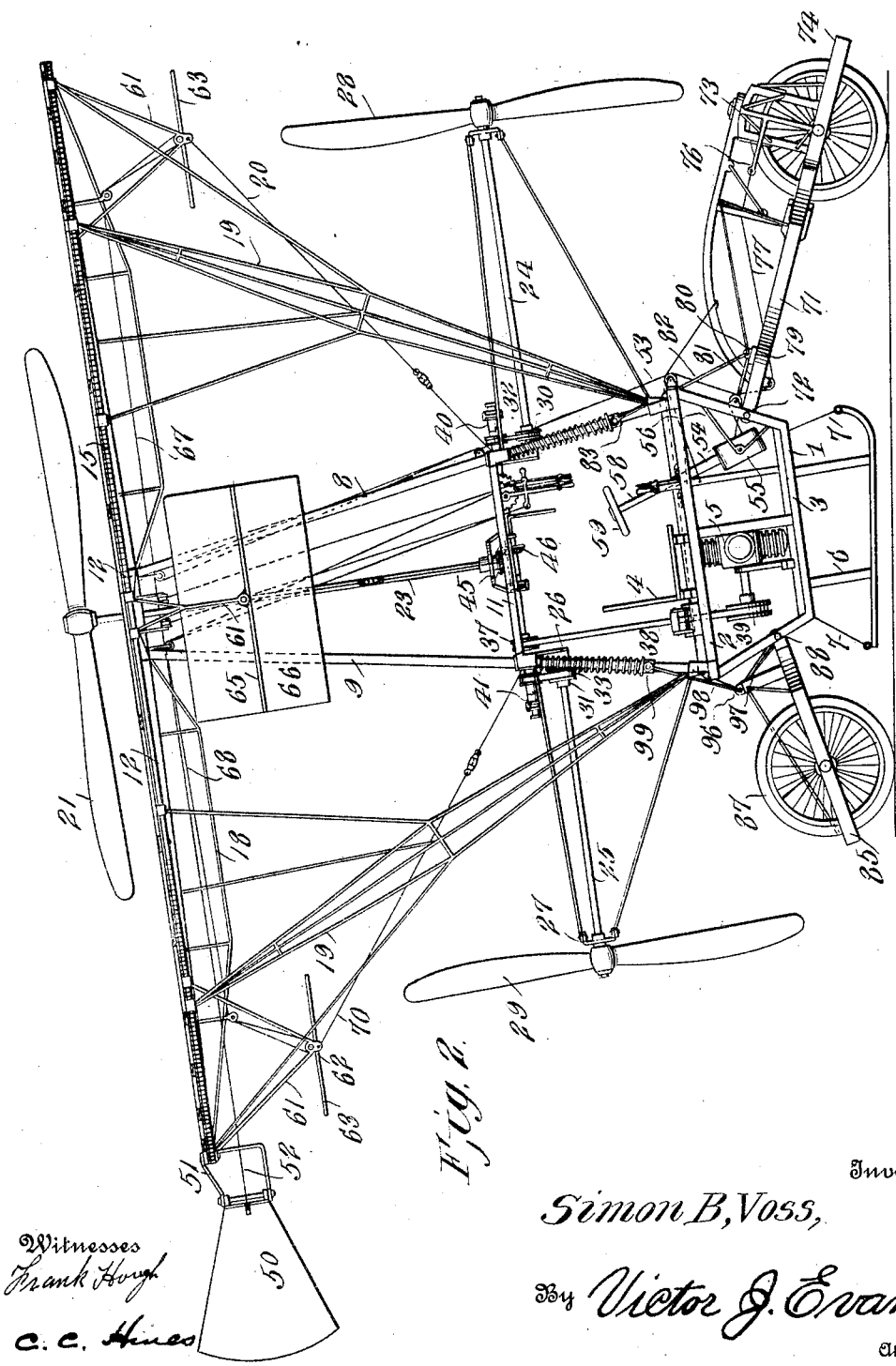
Figure 3:
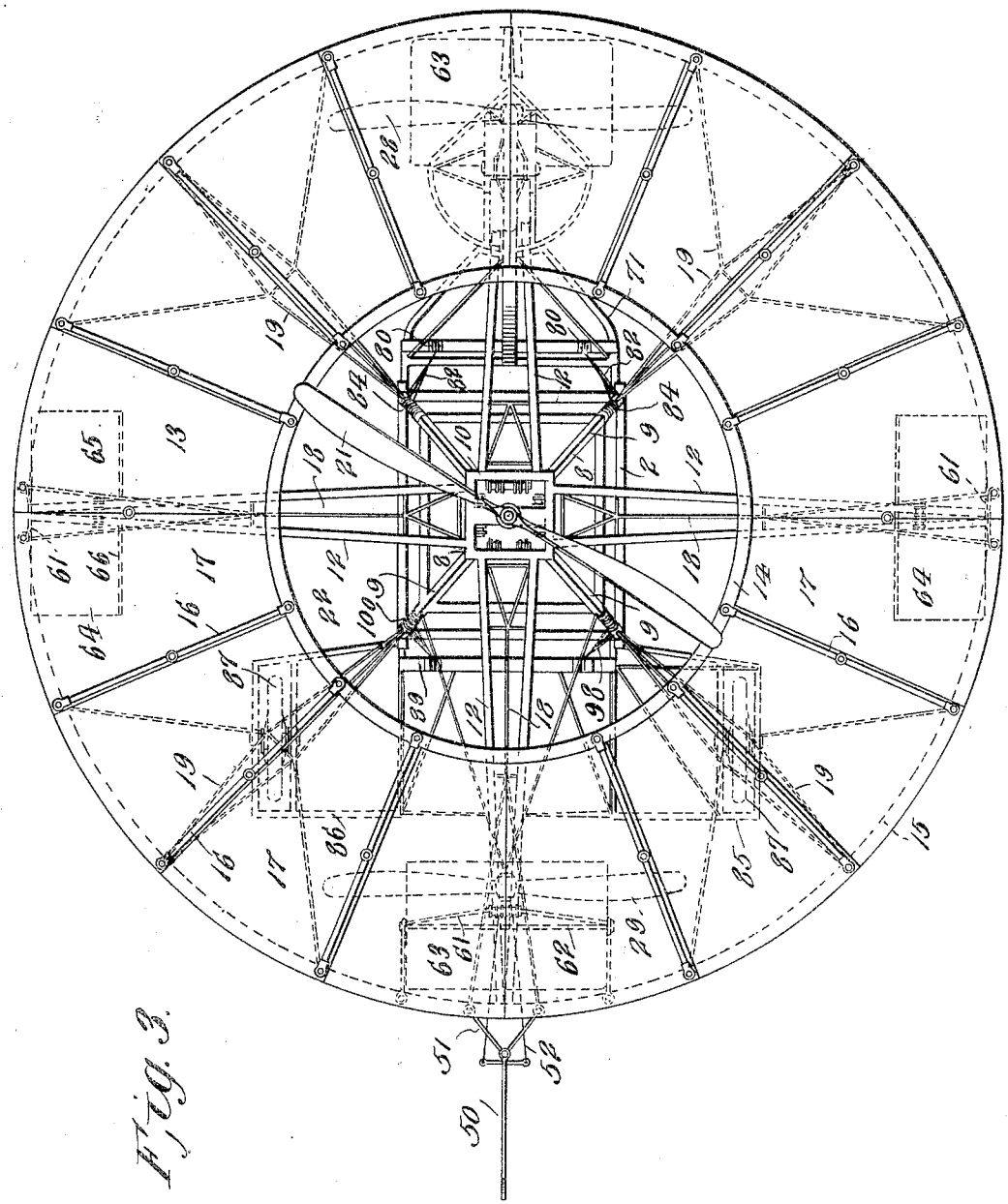
Figure 4:
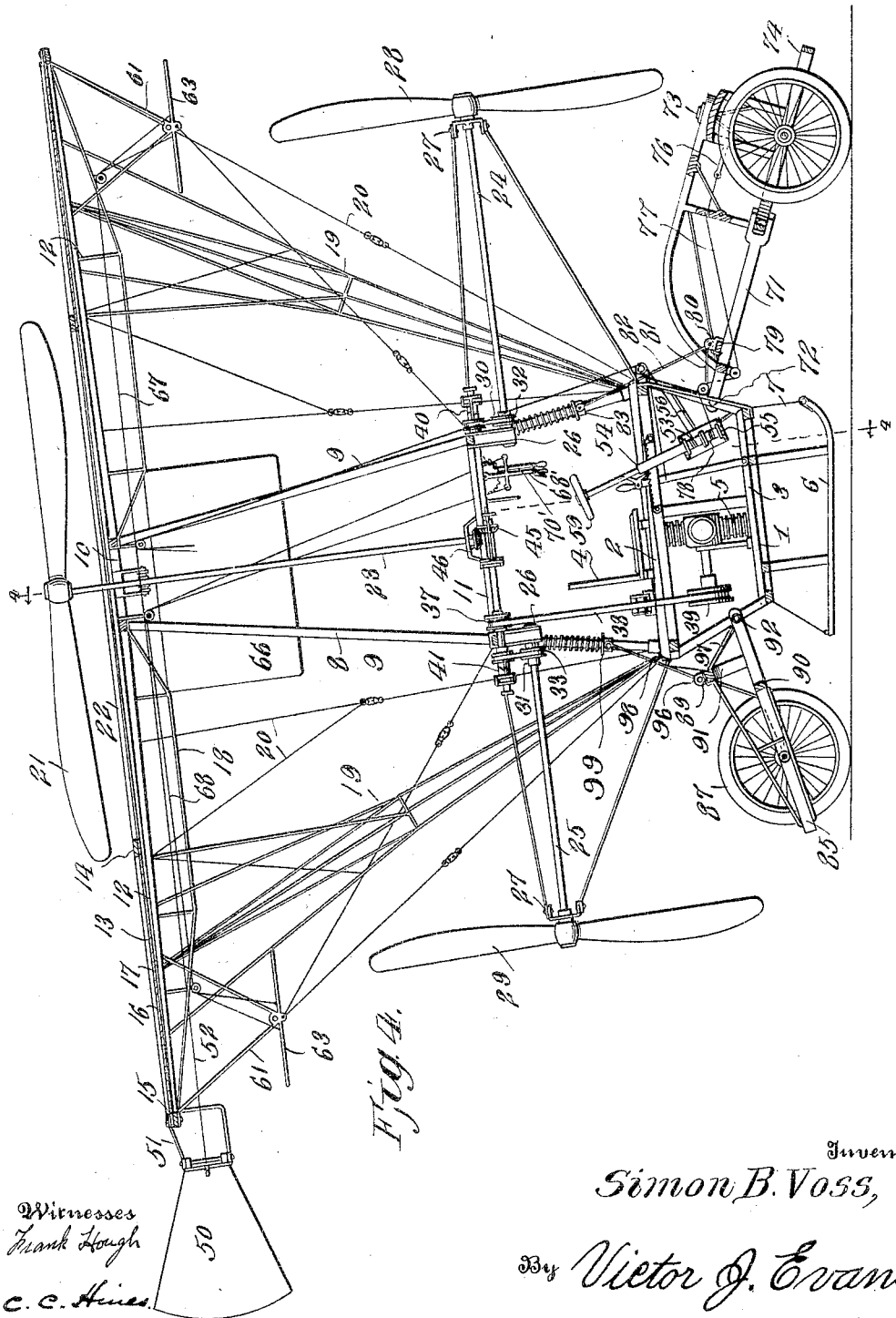

Figure 1 is a front elevation of a flying machine embodying my invention. Fig. 2 is a side elevation of the same. Fig. 3 is a top plan view. Fig. 4 is a vertical longitudinal section. Fig. 5 is a vertical transverse section on the line 4—4 of Fig. 4. Fig. 6 is a view of a portion of the main frame and the propeller shafts and transmission and clutch mechanism. Fig. 7 is a diagrammatical perspective view of the steering and controlling devices. Fig. 8 is a fragmentary perspective view of the main frame, showing the construction and mode of mounting the front frame extension or section of the carriage. Fig. 9 is a similar view of a portion of the main frame, showing the construction of mounting the rear frame extension or section of the carriage.

Referring to the drawings, 1 designates the car or base portion of the main frame of the machine, which is preferably of generally rectangular form, and provided with superposed openwork grids or platforms 2 and 3 to support the aviator's seat 4 and the driving motor 5, the lower grid or platform 3 also serving as a support for suitable landing skids 6 reinforced from the frame by stays 7. The aviator's seat and the motor are arranged at the base of the frame, together with the fuel supplying means employed in practice, to give a low center of gravity, coacting with the improved construction and arrangement of supporting surface and adjustable carriage sections, hereinafter described, to give inherent stability and to enable the machine to be trimmed and balanced with great facility.

Rising from the car 1 is a frusto-pyramidal mast or tower 8, including corner posts or beams 9, rigidly fastened to the frame and tied and braced by head bars 10 and center bars 11. From the head bars radiate front, rear and lateral truss-arms 12 which carry a supporting plane or surface 13 of circular form, said plane being of proper area and inclined at a suitable angle of incidence for sustentation effect. The plane or supporting surface comprises inner and outer rims 14 and 15, ribs 16 and segmental plates or sections 17 suitably secured to each other and to the rims and ribs, said segmental plates or sections being formed of a light sheet metal or other suitable material. Skeleton braces 18, of a truss-work type, reinforce the arms 12 and body of the supporting surface, which is also stayed and reinforced from the frame by skeleton trusswork guys 19 and brace rods or cables 20.

A lifting propeller 21 is arranged to rotate directly above a circular opening 22 in the supporting plane 13 and has a working sweep corresponding to the diameter thereof, so that the bank of air depressed by the propeller will flow under and react against the supporting surface, thereby greatly augmenting the lifting capacity of the machine. This propeller is mounted upon the upper end of a vertical shaft 23 suitably journaled upon and arranged within the upper portion of the mast. By means of this propeller, which may be rotated at varying speeds, the machine may be caused to directly ascend or descend, and to hover in the air over any given point, and by its proper control the speed of descent of the machine may at all times be governed.

Shafts 24 and 25 extend longitudinally at the front and rear of the frame and are journaled in brackets 26 on the frame and brackets 27 extending outwardly from the frame, which shafts carry propellers 28 and 29 for driving the machine ahead. At their inner ends said shafts carry pulleys 30 and 31 connected by belts 32 and 33 with pulleys 34 and 35 on a longitudinally extending transmission shaft 36 carrying a main drive pulley 37 receiving motion by means of a belt 38 from a pulley 39 on the motor shaft. Clutch members 40 and 41 are feathered to the transmission shaft and adapted for engagement with clutch surfaces on the pulleys 30 and 31, whereby the propellers 28 and 29 may be simultaneously or independently driven. The said clutches 40 and 41 are adjustable by means of shifting devices 42 and 43 each adapted to engage a toothed rack 44, whereby they may be secured in adjusted position. On the shaft 36 is a gear 45 meshing with a gear 46 on the lower end of the shaft 23, whereby the lifting propeller 21 may be driven. The said gear 45 is loose on the transmission shaft and provided with a clutch sleeve 47 adapted to be engaged by a clutch member 48 by means of a shifting device 49 adapted for engagement with one of the racks 44, whereby it may be secured in adjusted position. It will thus be understood that the propellers may be thrown into or out of operation for independent or conjoint action as occasion may require in the operation or control of the machine.

A vertical rudder 50 is pivoted to swing laterally on a bracket 51 at the rear of the supporting surface and is provided with crank arms to which are attached the rear ends of controlling cables 52, which are oppositely wound at their forward ends upon a drum 53 mounted on a control shaft 54. The shaft 54 is journaled at its lower end in a bearing box 55 pivoted to tilt in a fore and aft direction upon a bracket 56, whereby it may be disposed relative to the seat 4 to suit the convenience of the aviator. The shaft 54 preferably consists of a lower sleeve section 57 telescopically receiving an upper rod section 58 provided with a hand wheel 59 and adjustably secured to the section 57 by a set screw 60, so that the length of the shaft may be varied as the aviator may desire.

Bracket arms 61 are arranged in pairs at the front, rear and on opposite sides of the frame and depend from the supporting surface, which brackets support horizontal transverse shafts 62. On the front and rear transverse shafts are pivotally mounted elevating planes 63, which are tiltable from a horizontal to a vertical position, and vice versa. On the lateral transverse shafts are mounted stabilizers 64, which are similarly movable, and each of which comprises a normally horizontal surface 65 and a normally vertical surface 66, extending above and below the horizontal surface. The stabilizers are simultaneously or independently tiltable to control lateral stability, while the elevating planes are tiltable simultaneously or independently for vertical steering or to control longitudinal stability. The vertical surfaces of the stabilizers operate to prevent the machine from skidding, and serve also in conjunction with the elevators to coöperate with the supporting surface to secure a parachutic action, in case of danger or stoppage of the motor, as hereinafter described.

Control cords 67 and 68, arranged in pairs, connect the elevators with pivoted control levers 67' and 68', and control cords 69 and 70 also arranged in pairs, connect the stabilizers with control levers 69' and 70'. These levers are arranged in suitable relation to the aviator's seat to enable the aviator to adjust the elevators and stabilizers independently or conjointly in any manner required to steer and stabilize the machine. In the event of the stoppage of the motor, or, if, from any other cause, the machine loses its sustentation power, the aviator by adjusting the elevator and planes to a vertical position will dispose them to act as resistance surfaces tending to maintain a body of air beneath the circular supporting plane, by which the latter will be caused to perform the function of a parachute having sufficient sustaining resistance to adapt the machine to descend slowly to the ground and come to safe landing.

At the front of the car 1 is a supporting member or extension 71 pivoted at 72 for vertical movement and to the outer end of which is pivoted, as at 73, a caster frame 74 in which is journaled a suitably cushioned launching and landing wheel 75. The frame 74 is provided with crank arms 76 to which are connected cords or cables 77 wound oppositely upon a drum 78 on the control shaft 54, whereby the wheel 75 may be turned to steer the machine on the ground, the construction of the controlling connections described being such that both the vertical rudder and steering wheel 75 may be adjusted by a single control device. The carriage section or extension 71 has a cross bar 79, on which bear flanged pressure shoes or plates 80, connected with the sides of the car 1 by resilient arms 81 and pivotally coupled by connecting rods 82 with sleeves 83 slidably mounted on the lower rounded ends of the corner posts 9. Coiled cushioning springs 84, bearing against suitable abutments at their upper ends, exert pressure at their lower ends against the sleeve. The construction described provides cushioning mechanism yieldingly sustaining the carriage section and steering wheel against upward motion, while permitting them to have yielding movement under certain conditions. At the rear of the car is another extension or carriage section, composed of a pair of side supporting frames 85 and 86 on which are journaled cushion supporting wheels 87. The said frames 85 and 86 are pivoted to the car, as at 88, and are connected adjacent their inner ends by upper and lower cross pieces 89 and 90, which are in turn coupled to a central bar 91, also pivoted to the car, as at 92. Truss braces 93 couple the transverse connecting bars with the inner rear corners of the frames 85 and 86, which portions of said frames are also connected by a bracing cable 94 provided with a tensioning device 95. The connections named are resilient and by this construction it will be seen that while the carriage frames are permitted to have yielding movement together, they are also permitted, by reason of the resiliency of their connections, to have independent resilient vertical play, thus providing for a proper cushioning action in landing while also permitting the wheels 87 to ride over irregularities of ground surface without injury.

Flanged pressure shoes or plates 96, similar to the shoes 80, are connected to the sides of the car by resilient arms 97 and bear upon the cross bar 89 to oppose a yielding resistance to the upward movement of the said rear carriage section or extension. Connecting rods 98 couple said shoes to sleeves 99 slidable on the lower rounded ends of the rear corner posts 9, said sleeves being backed by coiled cushioning springs 100, mounted similarly to the springs 84 and acting in like manner. The carriage frame sections are adapted to normally sustain the weight of the machine upon the ground, but in the event that they are forced upward to the limit of their cushioning motion the skids 6 will come in contact with the ground and sustain the shock and reduce liability of damage to the machine. Levers 101 and 102 are pivoted upon the car for fore and aft motion and are provided with dogs 103 to engage racks 104, for locking them in adjusted position. These levers are connected by cables 105 and 106 with the front and rear carriage sections, so that said sections may be allowed to drop down or be swung upward to lie to a greater or less extent within or beyond the vertical plane of the car, so that they will serve as stabilizers adjustable when the machine is in flight to vary the center of gravity for trimming or stabilizing action, by which additional safety and advantage in the operation of the machine is secured. In practice, the truss braces beneath the supporting plane are preferably utilized as supports for the passage of the controlling wires or cables leading to the elevators and stabilizers, which cables in addition pass over suitable guide pulleys, thus preventing them from becoming bound or caught, as will be readily understood.

I claim:—

1. A flying machine having a supporting plane of circular form, elevating planes disposed beneath the front and rear portions of said circular plane, stabilizing planes arranged beneath the lateral portions of the circular plane, said elevating and stabilizing planes being mounted to tilt from a horizontal to a vertical position on horizontal transverse axes, and means for tilting said elevating and stabilizing planes.

2. A flying machine having a supporting plane of circular form, elevating planes disposed beneath the front and rear portions of said circular plane, stabilizing planes having horizontal and vertical surfaces and arranged beneath the lateral portions of the circular plane, said elevating and stabilizing planes being mounted to tilt from a horizontal to a vertical position on horizontal transverse axes, and means for tilting said elevating and stabilizing planes.

3. A flying machine having a supporting plane of circular form, a vertical shaft extending upwardly through the opening in said plane, a lifting propeller carried by said shaft and arranged to rotate immediately above the opening in the plane, said propeller having a circular sweep corresponding substantially to the circumference of the opening, elevating planes disposed beneath the front and rear portions of said circular plane, stabilizing planes having horizontal and vertical surfaces and arranged beneath the lateral portions of the circular plane, said elevating and stabilizing planes being mounted to tilt from a horizontal to a vertical position on horizontal transverse axes, and means for tilting said elevating and stabilizing planes.

4. A flying machine comprising a car, a frusto-pyramidal mast rising from the car, a supporting plane of circular form mounted upon the mast, a vertical shaft extending upward through the mast and opening in the supporting plane, a lifting propeller mounted upon said shaft to rotate above the opening in the plane, longitudinally extending shafts projecting in front and rear of the mast below the plane, driving propellers carried by said longitudinally extending shafts, power mechanism for driving the propeller shafts, elevating planes disposed beneath the front and rear portions of said circular plane, stabilizing planes having horizontal and vertical surfaces and arranged beneath the lateral portions of the circular plane, said elevating and stabilizing planes being mounted to tilt from a horizontal to a vertical position on horizontal transverse axes, and means for tilting said elevating and stabilizing planes.

5. A flying machine comprising a car, a mast rising from the car, a vertical shaft extending upward through the mast and opening in the supporting plane, a lifting propeller mounted upon said shaft to rotate above the opening in the plane, longitudinally extending shafts projecting in front and rear of the mast below the plane, driving propellers carried by said longitudinally extending shafts, power mechanism for driving the propeller shaft, elevating planes disposed beneath the front and rear portions of said circular plane, stabilizing planes arranged beneath the lateral portions of the circular plane, said elevating and stabilizing planes being mounted to tilt from a horizontal to a vertical position on horizontal transverse axes, and means for tilting said elevating and stabilizing planes.

In testimony whereof I affix my signature in presence of two witnesses.

SIMON B. VOSS.

Witnesses:
J. EDMOND STEVENS,
JOHN B. WHARTON.

Copies of this patent may be obtained for five cents each, by addressing the "Commissioner of Patents, Washington, D. C."